(12) United States Patent
Gebke et al.

(10) Patent No.: US 9,709,193 B2
(45) Date of Patent: Jul. 18, 2017

(54) PLIABLE AIR DUCTS WITH ANTI-CONDENSATION NOZZLES

(71) Applicants: Kevin J. Gebke, Dubuque, IA (US); Nicholas L. Kaufmann, Sherill, IA (US); Frank Heim, Platteville, WI (US)

(72) Inventors: Kevin J. Gebke, Dubuque, IA (US); Nicholas L. Kaufmann, Sherill, IA (US); Frank Heim, Platteville, WI (US)

(73) Assignee: RITE-HITE HOLDING CORPORATION, Milwaukee, WI (US)

( * ) Notice: Subject to any disclaimer, the term of this patent is extended or adjusted under 35 U.S.C. 154(b) by 701 days.

(21) Appl. No.: 13/749,321

(22) Filed: Jan. 24, 2013

(65) Prior Publication Data

US 2014/0202540 A1 Jul. 24, 2014

(51) Int. Cl.
  *F16L 55/027* (2006.01)
  *F16L 11/02* (2006.01)
  *F24F 13/02* (2006.01)
  *F24F 13/06* (2006.01)
  *F24F 13/22* (2006.01)

(52) U.S. Cl.
  CPC ........... *F16L 11/02* (2013.01); *F24F 13/0218* (2013.01); *F24F 2013/0608* (2013.01); *F24F 2013/221* (2013.01); *Y10T 137/0318* (2015.04)

(58) Field of Classification Search
  CPC ................... F16L 11/02; F24F 13/0218; F24F 2013/0608; F24F 2013/221; Y10T 137/0318; H01M 2220/20; H01M 2/1205; H01M 2/1229; H01M 2/1235; H01M 2/1241; H01M 2/1276; H01M 2/1288

USPC .......... 137/1, 15.21, 315.18; 138/40; 429/56
  See application file for complete search history.

(56) References Cited

U.S. PATENT DOCUMENTS

| 3,699,872 A | 10/1972 | Kruger |
| 5,044,259 A | 9/1991 | Catan et al. |
| 5,518,277 A * | 5/1996 | Sanders ................ F16L 41/082 285/189 |

(Continued)

FOREIGN PATENT DOCUMENTS

| CN | 1108378 A | 9/1995 |
| EP | 0658727 A2 | 6/1995 |
| GB | 2120778 A | 12/1983 |

*Primary Examiner* — Steven B McAllister
*Assistant Examiner* — Reginald McNeill, II
(74) *Attorney, Agent, or Firm* — Hanley, Flight & Zimmerman, LLC

(57) ABSTRACT

Pliable air ducts with anti-condensation nozzles are disclosed. An example system includes a tubular duct comprising a pliable wall dividing an interior of the tubular duct from an exterior of the tubular duct. The system includes an outlet member to be attached to the pliable wall. The outlet member defines a main air passageway with a first flow resistance therethrough and places the interior of the tubular duct in fluid communication with the exterior of the tubular duct. The system includes a secondary air passageway with a second flow resistance therethrough. The secondary air passageway is defined by at least one of the outlet member or the pliable wall and extends from the interior of the tubular duct to the exterior of the tubular duct to define an airflow path proximate the outlet member. The second flow resistance is significantly greater than the first flow resistance.

34 Claims, 7 Drawing Sheets

(56) References Cited

U.S. PATENT DOCUMENTS

| | | | | |
|---|---|---|---|---|
| 5,735,738 A * | 4/1998 | Kuno | ............... | F24F 13/22 |
| | | | | 454/296 |
| 6,565,430 B2 | 5/2003 | Gebke | | |
| 2004/0229559 A1* | 11/2004 | Gebke | ............ | F24F 13/0218 |
| | | | | 454/306 |
| 2006/0252365 A1* | 11/2006 | Gebke | ............... | F24F 11/043 |
| | | | | 454/306 |

* cited by examiner

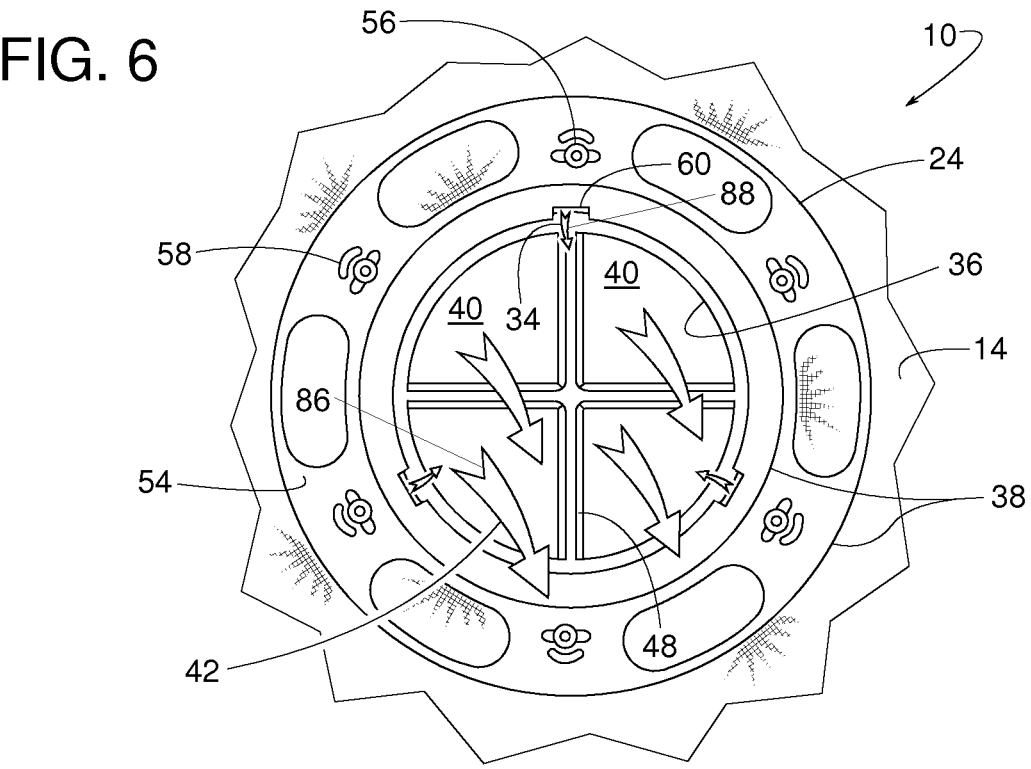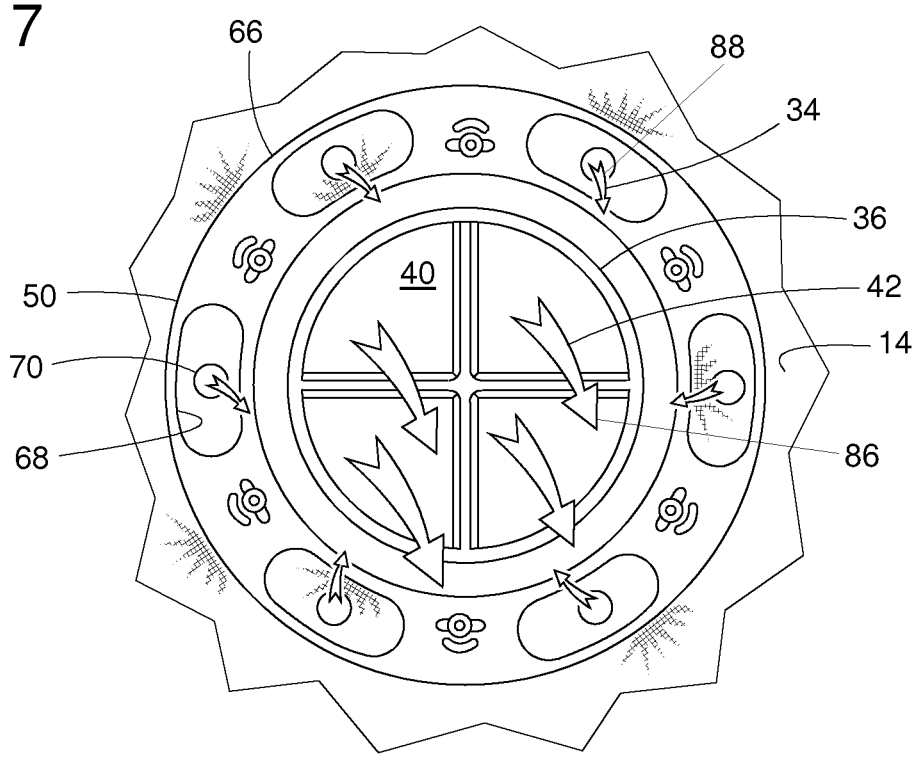

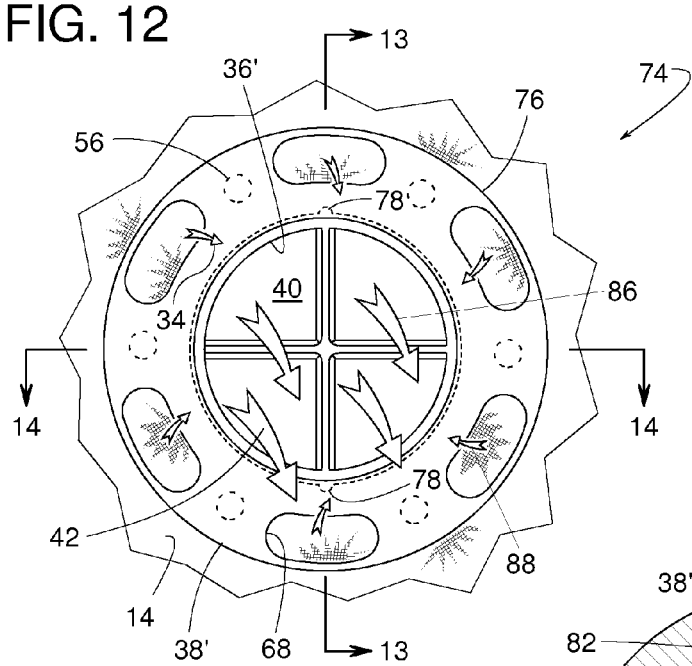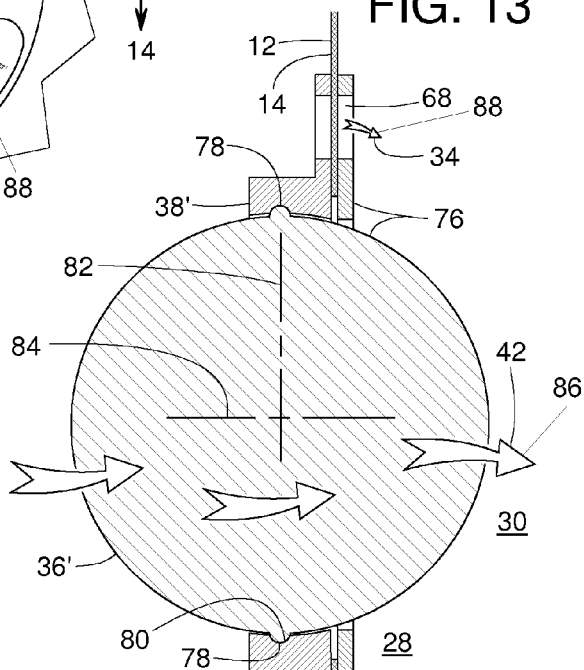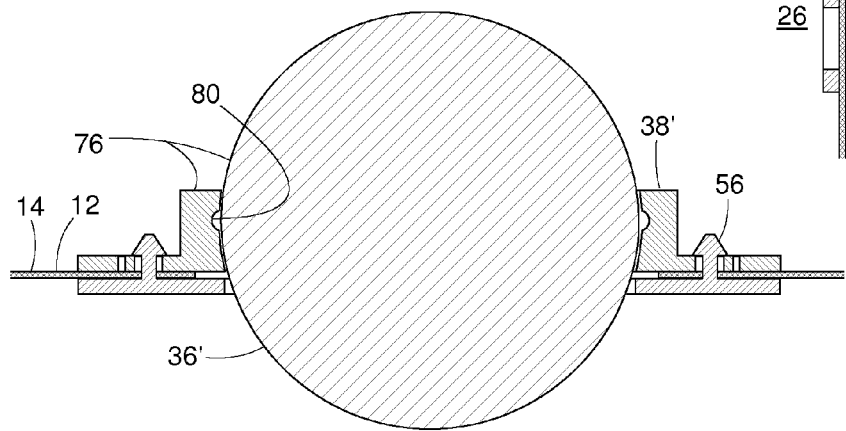

FIG. 14 is a cross-sectional view taken along line 14-14 of FIG. 12.

PLIABLE AIR DUCTS WITH ANTI-CONDENSATION NOZZLES

FIELD OF THE DISCLOSURE

This patent generally pertains to pliable air ducts and more specifically to pliable air ducts with anti-condensation nozzles.

BACKGROUND

In HVAC systems (heating, ventilating, air conditioning), conditioned supply air discharged from a blower is often conveyed to various rooms or areas within a building by way of ductwork. Conventional ductwork is typically formed of sheet metal and is often installed above ceilings for convenience and aesthetics. But in warehouses, manufacturing plants and many other buildings, the ducts are suspended below the ceiling and are thus exposed.

Many problems associated with exposed metal ducts are overcome by the use of fabric ducts, such as DUCTSOX® fabric ducts by Frommelt Safety Products Corporation of Milwaukee, Wis. Such ducts typically have a fabric wall that is air-permeable to broadly and evenly disperse the air into the room being conditioned or ventilated. If greater airflow is needed in certain areas, the fabric duct can be provided with additional discharge openings, such as air registers or cutouts in the fabric. Example fabric air ducts and discharge openings are disclosed in U.S. Pat. Nos. 6,958,011 and 6,960,130; which are specifically incorporated by reference herein.

BRIEF DESCRIPTION OF THE DRAWINGS

FIG. 6 is a front view of an example outlet member constructed according to the teachings disclosed herein.

FIG. 7 is a front view of another example air duct system with an example outlet member constructed according to the teachings disclosed herein.

FIG. 12 is a front view of another example air duct system with an example outlet member constructed according to the teachings disclosed herein.

FIG. 13 is a cross-sectional view taken along line 13-13 of FIG. 12.

DETAILED DESCRIPTION

Figure 1:
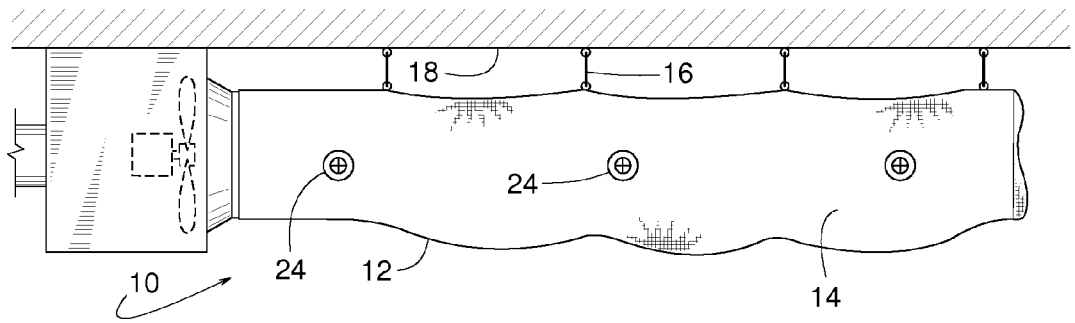
FIG. 1 is a front view of an example air duct system constructed according to the teachings disclosed herein.

An example air duct system 10 and associated method, shown in FIGS. 1-6, comprises a tubular air duct 12 with a pliable wall 14 made of fabric or some other type of pliable material. The term, "pliable material" refers to materials that when folded over onto itself, can be readily unfolded without appreciable damage or significant permanent deformation. Example materials of the pliable wall 14 include, woven or knit cloth, flexible plastic sheeting that is not necessarily woven, polyester, nylon, plastic impregnated cloth, fiber reinforced plastic, porous sheeting, nonporous sheeting, and various combinations thereof.

The duct 12 can be of any tubular cross-sectional shape including, but not limited to, round, semicircular, quarter-round, square, rectangular, triangular, etc. In some examples, portions of duct 12 comprise relatively rigid wall sections. The duct 12 can be mounted or supported by various means including, but not limited to, a series of hangers 16 suspending the duct 12 from an overhead structure 18 (e.g., cable, beam, joist, rafter, ceiling, etc.).

A source of airflow, such as a blower 20, forces air 22 through the duct 12, and one or more example vents or outlet members 24 on the pliable wall 14 releases air 22 from within an interior 26 of duct 12 to an exterior 28. Air discharged through the outlet member 24 serves to ventilate, cool, heat, dehumidify, humidify or otherwise condition an exterior conditioned air zone 30, such as a room or other area within a building.

Figure 2:
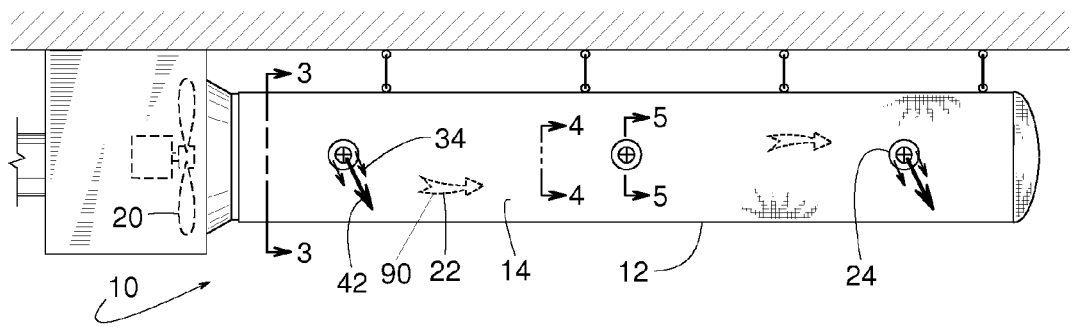
FIG. 2 is a front view of the system shown in FIG. 1 but with the air duct shown inflated.
Figure 3:
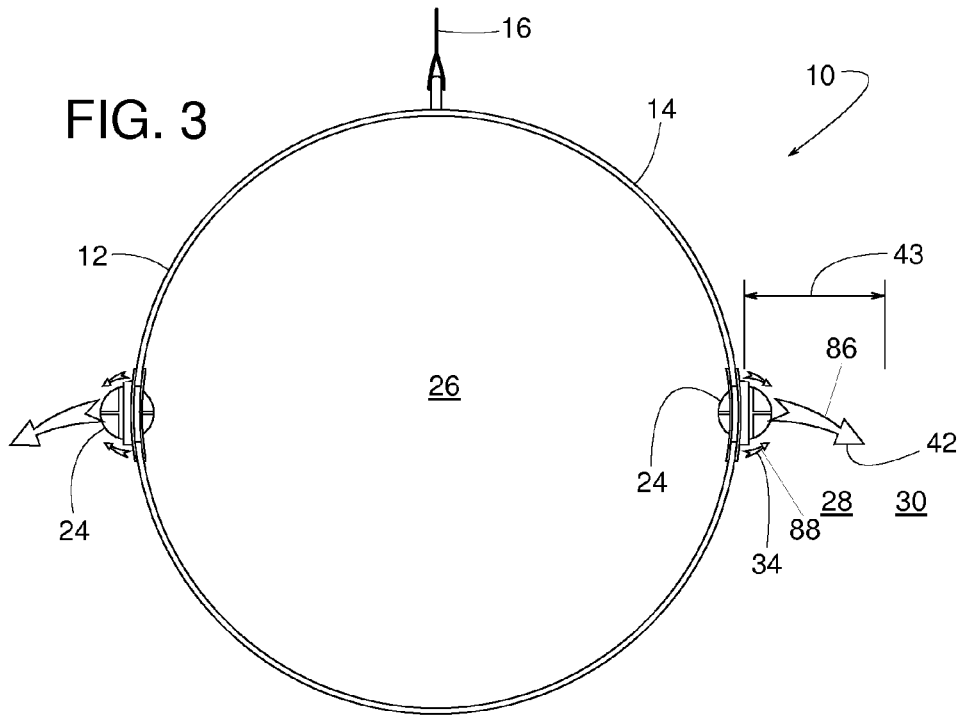
FIG. 3 is a cross-sectional view taken along line 3-3 of FIG. 2.

In some examples, selectively energizing and de-energizing blower 20 respectively inflates and deflates the duct 12. FIG. 1 shows the duct 12 deflated with the pliable wall 14 being generally limp, and FIG. 2 shows the duct 12 inflated with the pliable wall 14 being relatively taut. In some examples, pliable wall 14 is mechanically or otherwise held in a generally expanded shape even when the blower 20 is de-energized.

To help reduce (e.g., prevent) condensation from forming on an outer surface 32 of the outlet member 24, the duct 12 and/or the outlet member 24 includes means for conveying a secondary current of air 34 proximate the outlet member 24. In the example shown in FIGS. 1-6, the outlet member 24 comprises a nozzle 36 connected to a housing 38. The nozzle 36 defines a main air passageway 40 for conveying a primary current of air 42 from the interior 26 to the exterior 28 of the duct 12. To angularly adjust the flow direction of the primary current of air 42, in some examples, a ball-and-socket joint 44 between the nozzle 36 and the housing 38 permits the nozzle 36 to be manually tilted 46 within the housing 38. To further guide the airflow, in some examples, nozzle 36 includes one or more guide vanes 48 traversing the main air passageway 40.

In some examples, the housing 38 includes a mounting flange 50 for attaching the outlet member 24 to the pliable wall 14. The mounting flange 50, in some examples, comprises an inner flange section 52 and an outer flange section 54 that clamps the pliable wall 14 between the flange sections 52 and 54. To hold pliable wall 14 more securely, the clamping face of some example flange sections 52 and/or 54 have circumferential grooves and ridges that engage the pliable wall 14. A fastener 56 (e.g., snap, screw, rivet, etc.) connects the flange section 52 to the flange section 54. In some examples where the fastener 56 is in the form of a snap, an optional relief slot 58 eases the force needed to snap the flange sections 52 and 54 together.

Figure 4:
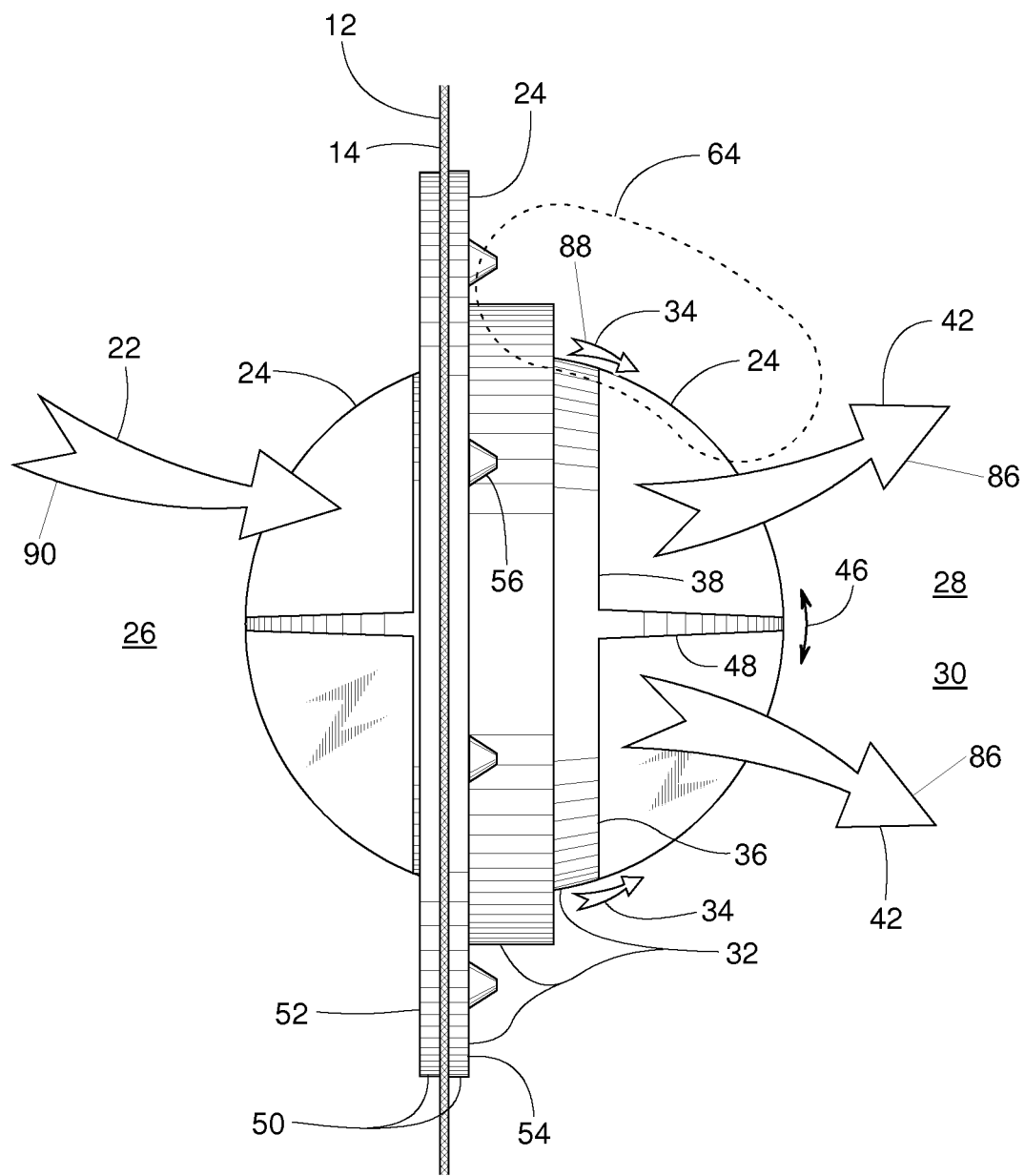
FIG. 4 is a cross-sectional view taken along line 4-4 of FIG. 2.
Figure 5:
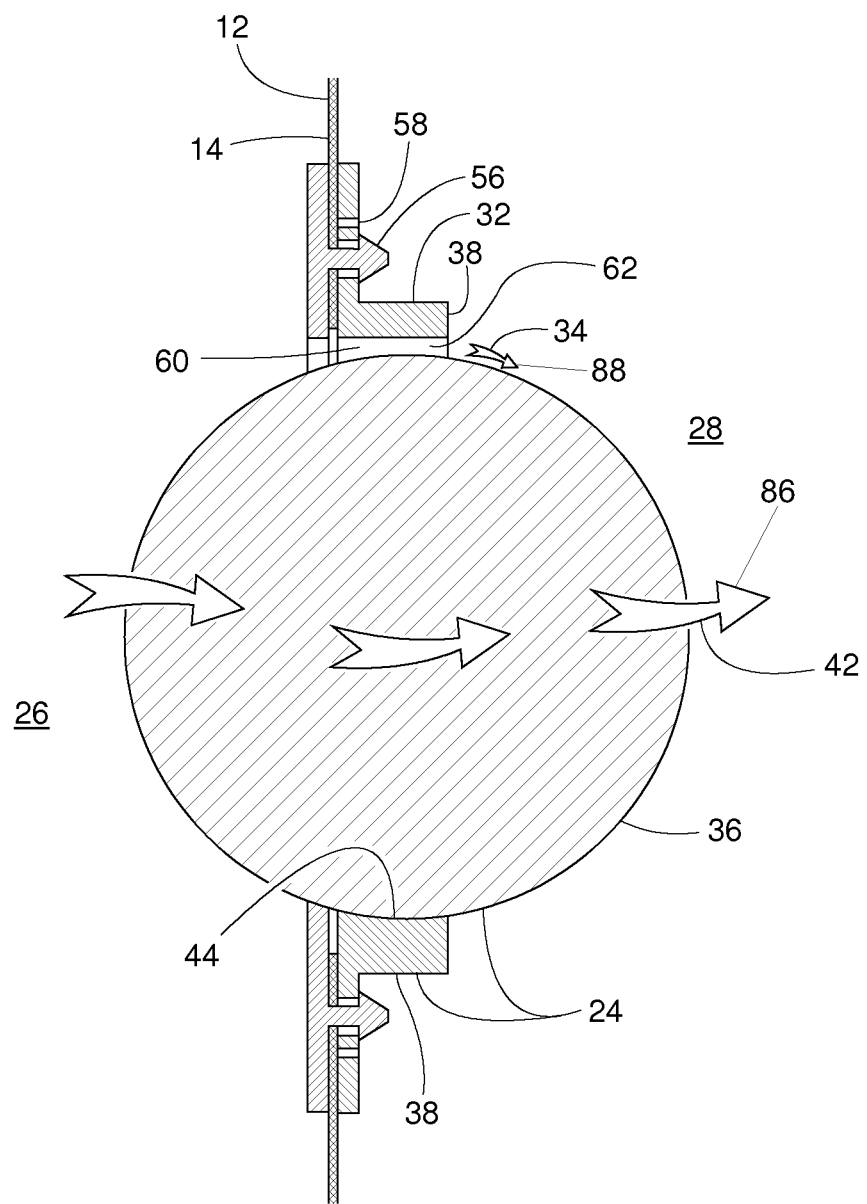
FIG. 5 is a cross-sectional view taken along line 5-5 of FIG. 2.

In the example shown in FIGS. 4-6, a secondary air passageway 60 at ball-and-socket joint 44 provides an air flow path 62 proximate the outer member 24. In the illustrated example, the secondary air passageway 60 comprises a plurality of openings (e.g., three are shown) distributed circumferentially around the main air passageway 40. In some examples, the main air passageway 40 has a first flow resistance and the secondary air passageway 60 has a second flow resistance, wherein the second flow resistance is significantly greater than the first flow resistance (e.g., at least thirty times greater). Consequently, airflow through the main air passageway 40 is much greater than the airflow through the secondary air passageway 60. As a result, in some cases (e.g., cooling, ventilating or dehumidifying), the relatively high volume of air flowing through the main air passageway 40 cools the outlet member 24 until the outlet member 24 reaches a point where condensation might tend to form on the outlet member 24 if it were not for the much lower volume of the secondary current of air 34 flowing across the outlet member's outer surface 32.

In some cases, the tendency of condensation to form seems to be exacerbated when the outlet member 24 is of a material that is more rigid and/or more thermally conductive than the pliable wall 14. For instance, in some examples, the outlet member 24 is made of a relatively rigid material so that the flange 50 snaps firmly together and/or the ball-and-socket joint 44 functions properly. However, some example implementations of the pliable wall 14 are relatively thin and flexible to reduce (e.g., minimize) weight and to permit machine washing. In some examples, materials of outlet member 24 include relatively rigid plastic, nylon, polyethylene, polypropylene, polyoxymethylene, etc.

In some examples, to overcome (e.g., reduce or minimize) this tendency of condensation to form on the outlet member 24, the flow resistance of the secondary passageway 60 is significantly greater (e.g., thirty times greater) than the flow resistance of main air passageway 40. As a result of the difference in flow resistance, the lower volume of the secondary current of air 34 (that passes through the secondary passageway 60) creates a buffer zone 64 of relatively low humidity, slow moving air that ventilates the area surrounding the outlet member 24. The creation of the buffer zone 64 in this manner reduces (e.g., inhibits) the formation of condensation on the outlet member 24 because the air in the buffer zone 64 is at a lower relative humidity than the air just beyond the buffer zone 64.

The surprising result of the relatively lower humidity buffer zone 64 may be explained in terms of the velocity of the primary and secondary currents of air 34, 42. In some examples, the primary current of air 42 flows through the outlet member 24 at a first average velocity, and the secondary current of air 34 adjacent the outer surface 32 flows at a second average velocity, wherein the first average velocity is appreciably greater than the second average velocity (e.g., at least twice as great). Considering the relatively high velocity of the primary current of air 42, the air passing beyond the buffer zone 64 has some opportunity to mix with moister air within the exterior conditioned air zone 30. The resulting air mixture beyond the buffer zone 64, thus, has a relative humidity and an average dew point that are higher than the air 22 within the duct 12. Since the air 34 flowing through the secondary air passageway 60 is much slower, the air 34 has a relative humidity and an average dew point that are much closer to that of the air 22 within the duct 12 and appreciably lower than that of the air beyond buffer zone 64 (e.g., 33% less). The term, "average dew point" refers to the dew point of an average sample of air within a specified zone.

Additionally or alternatively, the characteristics of the buffer zone 64 may be explained in terms of entrainment ratios associated with the primary and secondary currents of air 34, 42. The term "entrainment" refers to the ability of a flowing fluid (e.g., a jet stream of air) to draw or move another fluid (e.g., air in a room adjacent the jet stream) along with the flowing fluid. As flowing fluid induces adjacent fluid into the flowing fluid, the volumetric flow of the fluids increases and widens at a given section of the stream of flowing fluid. The term "entrainment ratio" is defined as the volumetric flow, at a specified distance from an outlet (e.g., where a jet stream originates), divided by the discharge volume flow rate at the outlet. Thus, in some examples, the primary current of air 42 flows through the outlet member 24 with a first entrainment ratio, and the secondary current of air 34 adjacent the outer surface 32 flows with a second entrainment ratio, wherein the first entrainment ratio is appreciably less than the second entrainment ratio (e.g., 50% less). The terms, "first entrainment ratio" and "second entrainment ratio" are measured with respect to a given distance 43 (FIG. 3) downstream of where the airflow generally exits the passageways 40 and 60. In some examples, the given distance 43 downstream of where the airflow exits the passageways 40 and 60 is approximately two inches, wherein this particular example (of approximately two inches) merely provides a general point of reference. Considering the relatively low entrainment ratio of the primary current of air 42, the air beyond the buffer zone 64 has some opportunity to mix with moister air within the exterior conditioned air zone 30, and the primary current of air 42 actually draws air from the air zone 30 into the buffer zone 64 by creating a lower pressure area within the buffer zone 64 than the air zone 30. The resulting air mixture beyond the buffer zone 64 thus has a relative humidity and an average dew point that are higher than the air 22 within the duct 12. Since the air 34 flowing through secondary air passageway 60 has much more entrainment, the air 34 quickly mixes with air from the air zone 30 and dilutes the air from the air zone 30 creating the buffer zone 64 where the relative humidity is much lower than that of air of the air zone 30.

Additional example passageways that provide a flow resistance that is significantly greater than that of a main passageway are shown in FIGS. 7-11. In the example of FIG. 7, an outlet member 66 has a mounting flange 50 with at least one flange opening 68 (e.g., hole or peripheral notch) aligned with at least one wall opening 70 in the pliable wall 14. The flange opening 68 and the wall opening 70 provide a secondary air passageway through which the secondary current of air 34 flows from the duct's interior 26 to the exterior 28 in proximity with the outlet member 66.

Figure 8:
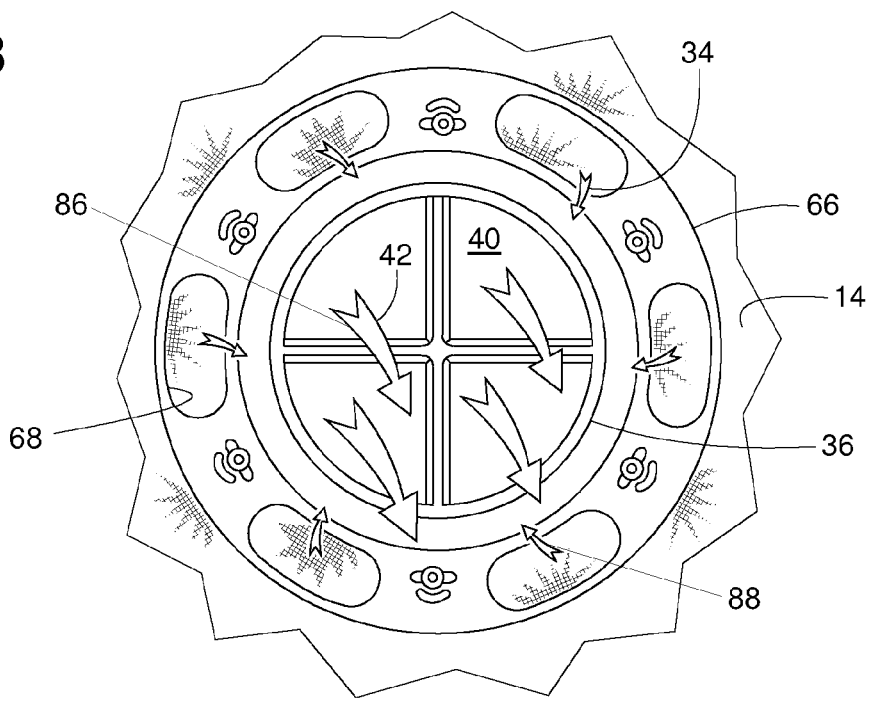
FIG. 8 is a front view of another example air duct system with an example outlet member constructed according to the teachings disclosed herein.

In the example of FIG. 8, the pliable wall 14 is porous and thus air permeable, at least in the area of the flange openings 68. The flange opening 68 and the pliable wall's porosity in that area provide a secondary air passageway through which the secondary current of air 34 flows from the duct's interior 26 to the exterior 28 in proximity with the outlet member 66.

Figure 9:
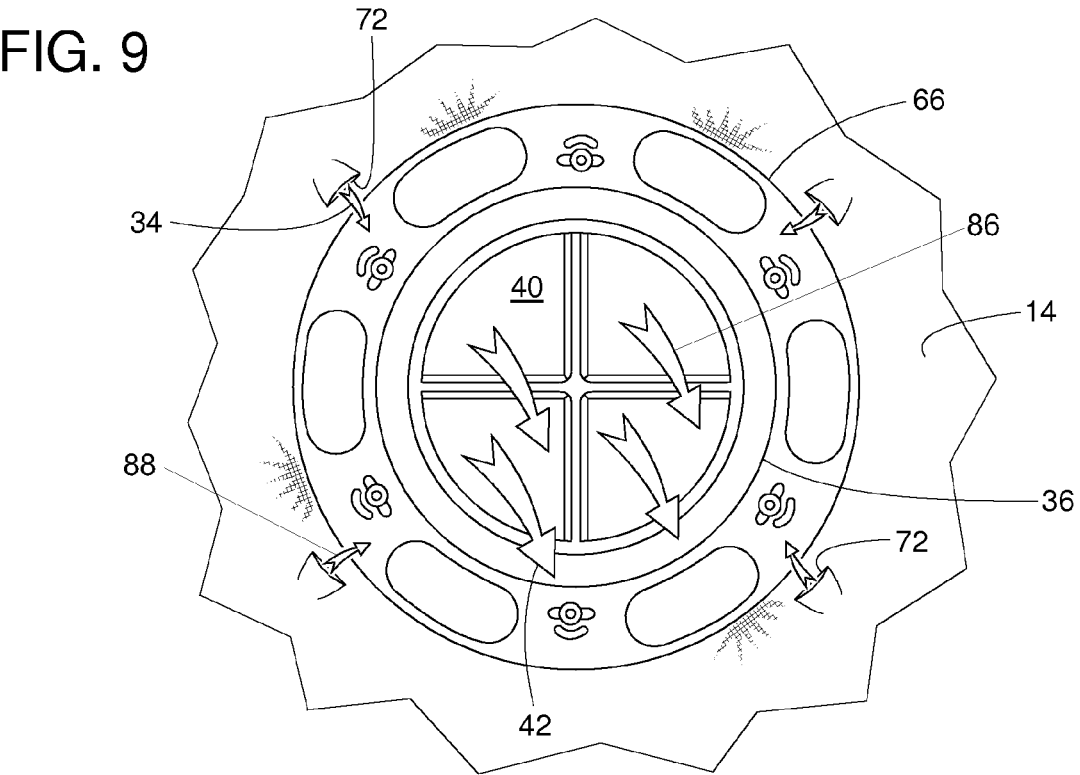
FIG. 9 is a front view of another example air duct system with an example outlet member constructed according to the teachings disclosed herein.

In the example of FIG. 9, the pliable wall 14 is shown having four wall openings 72 (e.g., hole, slit, etc.) distributed around the outlet member 66. The wall openings 72 provide a secondary air passageway through which the secondary current of air 34 flows from the duct's interior 26 to the exterior 28 in proximity with the outlet member 66.

Figure 10:
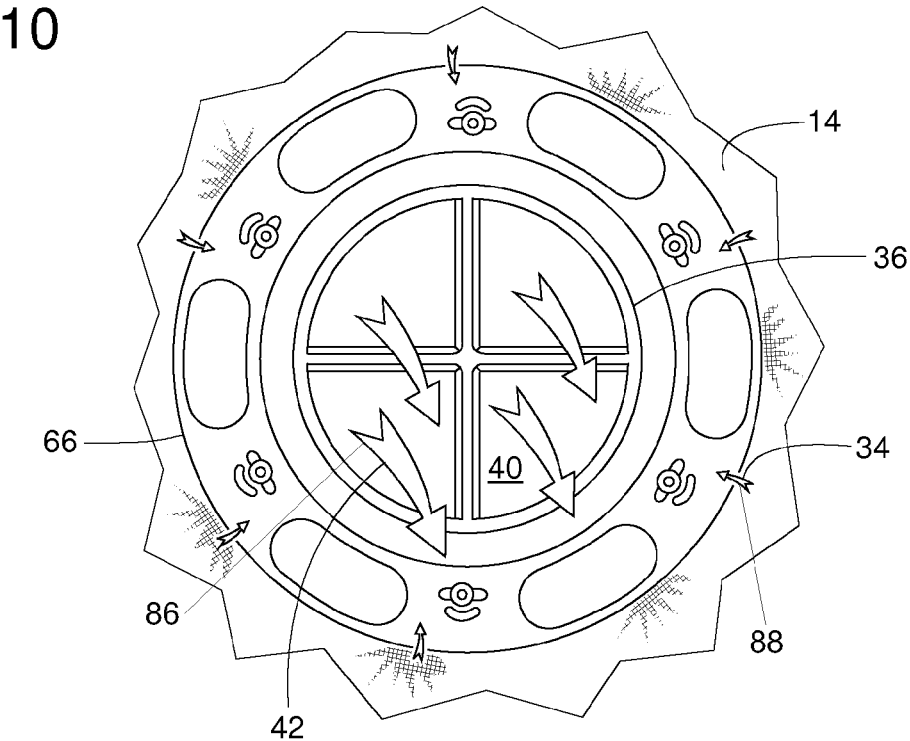
FIG. 10 is a front view of another example air duct system with an example outlet member constructed according to the teachings disclosed herein.

In the example of FIG. 10, the pliable wall 14 is porous in the area surrounding the outlet member 66. The pliable wall's porosity provides a secondary air passageway of a plurality of openings through which the secondary current of air 34 flows from the duct's interior 26 to the exterior 28 in proximity with the outlet member 66.

Figure 11:
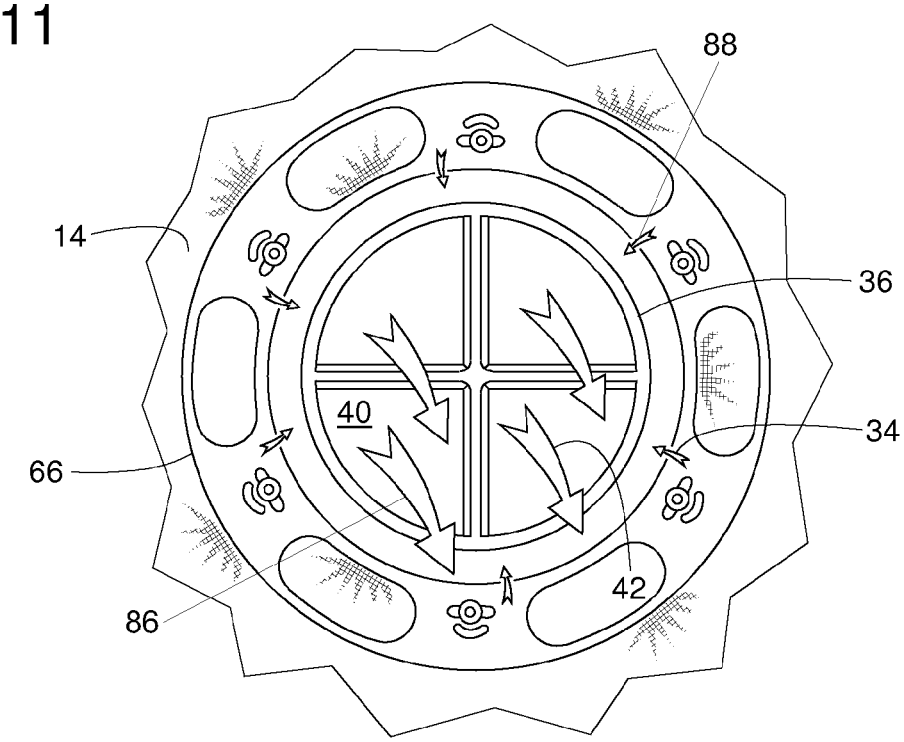
FIG. 11 is a front view of another example air duct system with an example outlet member constructed according to the teachings disclosed herein.

In the example of FIG. 11, at least portions of the outlet member 66 are porous. The outlet member's porosity provides a secondary air passageway of a plurality of openings through which the secondary current of air 34 flows from the duct's interior 26 to the exterior 28 in proximity with the outlet member 66.

FIGS. 12-14 illustrate an example air duct system 74 with another example outlet member 76. In this example, a majority of the outlet member 76 is situated within the interior 26 of the air duct 12 to reduce (e.g., minimize) the outlet member's exposure to relatively humid air in conditioned the air zone 30. Likewise, other example nozzles, such as those shown in FIGS. 1-11, can be configured in a similar manner, wherein most of the nozzle is disposed within the air duct's interior. In the example of FIGS. 12-14, the pliable wall 14 is porous and thus air permeable, at least in the area of the flange openings 68. The flange opening 68 and the pliable wall's porosity in that area provide a secondary air passageway through which the secondary current of air 34 flows from the duct's interior 26 to the exterior 28 in proximity with the outlet member 76.

In the example illustrated in FIGS. 12-14, the outlet member 76 includes a feature that makes it easier to adjust the discharge angle of a nozzle 36' relative to a housing 38'. Specifically, in some examples, the nozzle 36' includes a pair of integral protrusions 78 extending into a circumferential groove 80 in the housing 38'. The protrusions 78 provide somewhat of a trunnion mount that allows the nozzle 36' to pivot about a first axis 82. The protrusions 78 can also be manually slid circumferentially along the groove 80 so that the nozzle 36' can be rotated about a second axis 84 perpendicular to the first axis 82, thus providing the nozzle 36' with two axes of angular adjustability. 90

Regarding example air duct methods illustrated in FIGS. 1-14, arrow 86 represents discharging a primary current of air through the outlet member 24 attached to the pliable wall 14 of air duct 12. Arrow 86 also represents directing the primary current of air to the conditioned air zone 30. Arrow 88 represents discharging a secondary current of air to buffer zone 64 that is between the outer surface 32 of the outlet member 24 and the conditioned air zone 30. Arrow 90 in FIG. 2 represents conveying air through the tubular duct 12. Arrow 86 represents discharging a primary current of air from the interior of the tubular duct 12, through the main air passageway 40, and to the exterior conditioned air zone 30. Arrow 88 represents discharging a secondary current of air from within the interior of the tubular duct 12 to the buffer zone 64 between the outer surface 32 of the outlet member 24 and the exterior conditioned air zone 30.

Example air duct systems disclosed herein include a tubular duct having a pliable wall dividing an interior of the tubular duct from an exterior of the tubular duct. Some example systems include an outlet member to be attached to the pliable wall. The outlet member of some examples defines a main air passageway with a first flow resistance therethrough and places the interior of the tubular duct in fluid communication with the exterior of the tubular duct. Some example systems further include a secondary air passageway with a second flow resistance therethrough. The secondary air passageway of such examples is defined by at least one of the outlet member or the pliable wall. In some examples, the secondary air passageway extends from the interior of the tubular duct to the exterior of the tubular duct and defines an airflow path proximate the outlet member. In some examples, the second flow resistance is significantly greater than the first flow resistance.

In some examples, the secondary air passageway comprises a plurality of openings distributed circumferentially around the main air passageway. In some such examples, the secondary air passageway comprises the plurality of openings by virtue of the pliable wall being porous. In some examples, the secondary air passageway comprises the plurality of openings by virtue of the outlet member being porous. In some examples, the secondary air passageway is a wall opening through the pliable wall. In some examples, the outlet member includes a mounting flange extending at least partially around the main air passageway. The mounting flange of some such examples is to attach to the pliable wall and defines a flange opening. In some such examples, the secondary air passageway is to pass through the flange opening. In some examples, the outlet member includes a mounting flange extending at least partially around the main air passageway. In some such examples, the mounting flange includes an inner flange and an outer flange. In such examples, the pliable wall is to be sandwiched between the inner flange and the outer flange and the inner flange is attached to the outer flange. In some examples, the secondary air passageway comprises a plurality of wall openings through the pliable wall. The plurality of wall openings in some examples are distributed circumferentially around the main air passageway. In some examples, the outlet member includes a mounting flange extending at least partially around the main air passageway and the mounting flange is to be attached to the pliable wall. In some examples, the mounting flange defines a plurality of flange openings therethrough. In some such examples, the secondary air passageway is to pass through the plurality of wall openings and through the plurality of flange openings.

In some examples, the outlet member comprises a material that is more thermally conductive than the pliable wall. In some examples, the outlet member comprises a nozzle attached to a housing. The nozzle in some such examples defines the main air passageway. In some examples, the nozzle is angularly adjustable relative to the housing. In some examples, the housing includes a mounting flange to attach the outlet member to the pliable wall. In some examples, the secondary air passageway is between the nozzle and the housing. In some examples, the nozzle includes a guide vane traversing the main air passageway. In some examples, the outlet member is supported by the pliable wall and is comprised of a material that is more rigid than the pliable wall.

Some example methods comprise discharging a primary current of air through an outlet member attached to a pliable wall of an air duct. Some example methods further comprise directing the primary current of air to a conditioned air zone. Some example methods also comprise discharging a secondary current of air to a buffer zone that is between an outer surface of the outlet member and the conditioned air zone. In some examples, the outer surface of the outlet member is facing the conditioned air zone. In some examples, air within the buffer zone has a first average relative humidity, air within the conditioned air zone has a second average relative humidity, and the first average relative humidity is less than the second average relative humidity.

In some examples, the primary current of air flows through the outlet member at a first average velocity. The secondary current of air in some examples flows adjacent the outer surface of the outlet member at a second average velocity. In some such examples, the first average velocity is greater than the second average velocity. In some examples, the buffer zone substantially surrounds the outer surface of the outlet member. In some examples the secondary current of air substantially surrounds the outer surface of the outlet member. In some examples, the secondary current of air flows through the pliable wall by virtue of the pliable wall being porous. In some examples, the secondary current of air flows through the outlet member by virtue of the outlet member being porous. In some examples, the outlet member includes a mounting flange encircling a path of the primary current of air. In some such examples, the mounting flange is attached to the pliable wall and defines a flange opening. In some examples, the secondary current of air passes through the flange opening. In some examples, the outlet member includes a mounting flange that includes an inner flange and an outer flange. Some example methods further comprise clamping the pliable wall between the inner flange and the outer flange. In some examples, the mounting flange defines a flange opening therethrough. In some examples, the mounting flange encircles the primary current of air. Some such example methods further comprise discharging the secondary current of air through the flange opening. In some examples, the outlet member comprises a nozzle attached to a housing. The nozzle in some such examples is angularly adjustable relative to the housing and the housing includes a mounting flange attached to the pliable wall. Some such example methods further comprise discharging the primary current of air through the nozzle and discharging the secondary current of air between the nozzle and the housing. In some examples, the primary current of air flows through the outlet member with a first entrainment ratio for a given distance from the outlet member. In some examples, the secondary current of air flows adjacent the outer surface of the outlet member with a second entrainment ratio for the given distance. In some such examples the first entrainment ratio is less than the second entrainment ratio.

Other example methods comprise the use of a tubular duct having a pliable wall that separates an interior of the tubular duct from an exterior conditioned air zone and the use of an outlet member that is attached to the pliable wall. The outlet member in some such examples includes an outer surface facing the exterior conditioned air zone. In some examples, the outlet member defines a main air passageway leading from the interior of the tubular duct to the exterior conditioned air zone. Some such example methods convey air through the tubular duct. Such example methods further comprise discharging a primary current of air from the interior of the tubular duct through the main air passageway to the exterior conditioned air zone and discharging a secondary current of air from within the interior of the tubular duct to a buffer zone between the outer surface of the outlet member and the exterior conditioned air zone. In some such examples, air within the buffer zone has a first average dew point and air within the exterior conditioned air zone has a second average dew point, where the first average dew point is less than the second average dew point.

In some examples, the primary current of air flows through the outlet member at a first average velocity. In some examples, the secondary current of air flows adjacent the outer surface of the outlet member at a second average velocity. In some such examples, the first average velocity is greater than the second average velocity. In some examples, the secondary current of air substantially surrounds the outlet member. In some examples, the secondary current of air flows through the pliable wall by virtue of the pliable wall being porous. In some examples, the secondary current of air flows through the outlet member by virtue of the outlet member being porous. In some examples, the outlet member includes a mounting flange encircling the main air passageway, the mounting flange is attached to the pliable wall, the mounting flange defines a flange opening, and the secondary current of air passes through the flange opening. In some examples, the outlet member comprises a nozzle attached to a housing. In some such examples, the nozzle is angularly adjustable relative to the housing. In some examples, the housing includes a mounting flange attached to the pliable wall. Some example methods further comprise discharging the primary current of air through the nozzle and discharging the secondary current of air between the nozzle and the housing. In some examples, the primary current of air flows through the outlet member with a first entrainment ratio for a given distance from the outlet member. In some examples, the secondary current of air flows adjacent the outer surface of the outlet member with a second entrainment ratio for the given distance. In some such examples, the first entrainment ratio is less than the second entrainment ratio.

Example air duct outlet members disclosed herein include a housing to be attached to a wall of an air duct and a nozzle to be carried by the housing. In some examples, the nozzle defines a main air passageway for the discharge of a primary current of air from the air duct. In some examples, at least one of the housing or the nozzle defines a secondary air passageway for the discharge of a secondary current of air from the air duct.

In some examples, the main air passageway is associated with a first flow resistance and the secondary air passageway is associated with a second flow resistance, where the first flow resistance is less than the second flow resistance. In some such examples, the first flow resistance associated with the main air passageway and the second flow resistance associated with the secondary air passageway are to produce a difference in at least one of an average velocity or an entrainment ratio for a given distance of the primary current of air and the secondary current of air when discharged from the air duct. In some examples, the secondary current of air is to produce a buffer zone surrounding an outer surface of the outlet member exterior the air duct. In some examples, the buffer zone reduces condensation from forming on the outer surface. In some examples, the secondary air passageway is disposed adjacent an exterior of the nozzle. In some examples, the outlet member also includes a mounting flange associated with the housing to attach the outlet member to the wall of the air duct. In some examples, the secondary air passageway extends through an opening in the mounting flange. In some examples, a majority of the outlet member is to be disposed within an interior of the air duct.

Although certain example methods, apparatus and articles of manufacture have been described herein, the scope of the coverage of this patent is not limited thereto. On the contrary, this patent covers all methods, apparatus and articles of manufacture fairly falling within the scope of the appended claims either literally or under the doctrine of equivalents.

What is claimed is:

1. An air duct system, comprising:
   a tubular duct including a pliable wall dividing an interior of the tubular duct from an exterior of the tubular duct;
   an outlet member to be attached to the pliable wall, the outlet member defining a main air passageway with a first flow resistance therethrough, the outlet member including a mounting flange extending around the main air passageway, the mounting flange includes a rigid inner flange and a rigid outer flange, the pliable wall sandwiched between the inner flange and the outer flange during operation of the air duct system when the outlet member is attached to the pliable wall, the outlet member having an inner surface directly exposed to the interior of the tubular duct and an outer surface directly exposed to the exterior of the tubular duct, the main air passageway extending through the outlet member between the inner surface and the outer surface to place the interior of the tubular duct in fluid communication with the exterior of the tubular duct; and a secondary air passageway with a second flow resistance therethrough, the secondary air passageway being defined by at least one of the outlet member or the pliable wall, the secondary air passageway extending from the interior of the tubular duct to the exterior of the tubular duct, the secondary air passageway defining an airflow path proximate the outlet member, the second flow resistance being significantly greater than the first flow resistance.

2. The air duct system of claim 1, wherein the secondary air passageway includes a plurality of openings distributed circumferentially around the main air passageway.

3. The air duct system of claim 2, wherein the secondary air passageway includes the plurality of openings by virtue of the pliable wall being porous.

4. The air duct system of claim 2, wherein the secondary air passageway includes the plurality of openings by virtue of the outlet member being porous.

5. The air duct system of claim 1, wherein the secondary air passageway is a wall opening through the pliable wall.

6. The air duct system of claim 1, wherein the mounting flange is to be attached to the pliable wall, the mounting flange defines a flange opening, and the secondary air passageway to pass through the flange opening.

7. The air duct system of claim 1, wherein the secondary air passageway includes a plurality of wall openings through the pliable wall, the plurality of wall openings are distributed circumferentially around the main air passageway, the mounting flange is to be attached to the pliable wall, the mounting flange defines a plurality of flange openings therethrough, the secondary air passageway to pass through the plurality of wall openings and through the plurality of flange openings.

8. The air duct system of claim 1, wherein the outlet member includes a material that is more thermally conductive than the pliable wall.

9. The air duct system of claim 1, wherein the outlet member includes a nozzle attached to a housing, the nozzle defines the main air passageway, the nozzle is angularly adjustable relative to the housing, and the housing includes the mounting flange to attach the outlet member to the pliable wall.

10. The air duct system of claim 9, wherein the secondary air passageway is between the nozzle and the housing.

11. The air duct system of claim 9, wherein the nozzle includes a guide vane traversing the main air passageway.

12. The air duct system of claim 1, wherein the second flow resistance is at least thirty times greater than the first flow resistance.

13. The air duct system of claim 1, wherein the first flow resistance produces a first average velocity for a primary current flowing through the main air passageway, the second flow resistance produces a second average velocity for a secondary current flowing through the secondary air passageway, and the first average velocity is greater than the second average velocity.

14. The air duct system of claim 1, wherein the first flow resistance and the second flow resistance produce a buffer zone between the outer surface of the outlet member and a conditioned air zone.

15. The air duct system of claim 14, wherein air within the buffer zone has a first average relative humidity, air within the conditioned air zone has a second average relative humidity, and the first average relative humidity is less than the second average relative humidity.

16. The air duct system of claim 14, wherein air within the buffer zone has a first average dew point, air within the conditioned air zone has a second average dew point, and the first average dew point is less than the second average dew point.

17. The air duct system of claim 14, wherein the buffer zone substantially surrounds the outer surface of the outlet member.

18. The air duct system of claim 1, wherein a primary current of air flows through the main air passageway with a first entrainment ratio for a given distance from the outlet member, a secondary current of air flows through the secondary air passageway with a second entrainment ratio for the given distance, and the first entrainment ratio is less than the second entrainment ratio.

19. The air duct system of claim 1, wherein a primary current of air flows through the main air passageway, a secondary current of air flows through the secondary air passageway, and the secondary current of air surrounds the outlet member.

20. The air duct system of claim 1, wherein a primary current of air flows through the main air passageway, a secondary current of air flows through the secondary air passageway, and the secondary current of air is to produce a buffer zone surrounding the outer surface of the outlet member exterior to the tubular duct, the buffer zone to reduce condensation from forming on the outer surface.

21. The air duct system of claim 1, wherein a majority of the outlet member is to be disposed within the interior of the tubular duct.

22. The air duct system of claim 1, wherein the inner surface of the outlet member extends radially inward from the pliable wall of the tubular duct and the outer surface of the outlet member extends radially outward from the pliable wall of the tubular duct.

23. The air duct system of claim 1, wherein the outlet member includes a rigid nozzle that extends through an opening in the pliable wall, the main air passageway to extend through the nozzle.

24. The air duct system of claim 23, wherein the outlet member includes a rigid housing to support the nozzle.

25. The air duct system of claim 24, wherein the nozzle is to move relative to the housing.

26. The air duct system of claim 1, wherein an outer extremity of the main air passageway is defined by an opening in the outlet member, the opening in the outlet member being larger than a plurality of openings associated with the secondary air passageway.

27. The air duct system of claim 1, wherein the inner surface of the outlet member is to protrude into the interior of the tubular duct and the outer surface of the outlet member is to protrude into the exterior of the tubular duct beyond the pliable wall.

28. The air duct system of claim 1, wherein the mounting flange extends circumferentially around the main air passageway.

29. The air duct system of claim 1, wherein the outlet member includes a nozzle having a generally spherical shape.

30. The air duct system of claim 29, wherein the outlet member includes a housing to support the nozzle, the nozzle rotatable relative to the housing about a first axis.

31. The air duct system of claim 30, wherein the nozzle is rotatable relative to the housing about a second axis substantially perpendicular to the first axis.

32. The air duct system of claim 1, wherein the inner flange is to be attached to the outer flange via a fastener extending through the pliable wall.

33. The air duct system of claim 1, wherein the inner flange is to abut an inside surface of the pliable wall on the interior of the tubular duct and the outer flange is to abut an outside surface of the pliable wall on the exterior of the tubular duct.

34. The air duct system of claim 1, wherein the main air passageway is unobstructed by the pliable wall of the tubular duct.

\* \* \* \* \*